United States Patent [19]

Sherman

[11] 4,348,919
[45] Sep. 14, 1982

[54] ATTACHMENT AND METHOD FOR GRINDING AND FILING CHAIN SAW BARS

[76] Inventor: William E. Sherman, P.O. Box 95, Silver City, N. Mex. 88061

[21] Appl. No.: 72,425

[22] Filed: Sep. 4, 1979

[51] Int. Cl.³ .............................................. B23D 63/00
[52] U.S. Cl. ......................................... 76/112; 76/83; 76/25 R
[58] Field of Search ...................... 76/112, 25 A, 25 R, 76/36, 88, 83, 74; 51/205 WG, 210, 214, 241 S, 241 G, 241 LG, 170 T, 281 R

[56] References Cited

U.S. PATENT DOCUMENTS

| | | | |
|---|---|---|---|
| 493,174 | 3/1893 | McClure | 76/83 |
| 1,006,940 | 10/1911 | Haynes | 76/83 |
| 1,196,399 | 8/1916 | Ryan | 76/83 |
| 2,428,473 | 10/1947 | Slocum | 51/214 |
| 2,938,312 | 5/1960 | Mall | 76/112 |
| 4,191,074 | 3/1980 | Sherman | 76/25 R |

FOREIGN PATENT DOCUMENTS

| | | | |
|---|---|---|---|
| 277135 | 6/1965 | Australia | 51/170 T |
| 906037 | 9/1962 | United Kingdom | 51/170 T |

Primary Examiner—Roscoe V. Parker
Attorney, Agent, or Firm—Bernard, Rothwell & Brown

[57] ABSTRACT

An attachment is provided which includes a support member of L-shaped cross section having a first aperture in one leg through which a grinding wheel may extend and a second aperture in the other leg for receiving the shaft of the grinding wheel. An adjustably mounted plate having a third aperture therein is secured to the second leg and arranged to be brought into spaced relation to the first leg so that the first leg and the plate may ride along the opposite faces of the chain saw bar for effectively guiding the attachment and a grinding wheel mounted thereon along the edge of the bar. To effect grinding of the face of the chain saw bar the same attachment is employed but is positioned so that the plate rides along the edge of the chain saw bar to provide an effective guide. In addition the first and third apertures are shaped for receiving and firmly holding a file for filing the edge of the chain saw bar as the attachment is moved along the bar.

11 Claims, 9 Drawing Figures

ATTACHMENT AND METHOD FOR GRINDING AND FILING CHAIN SAW BARS

BACKGROUND OF THE INVENTION

The invention relates to a method and apparatus for grinding and filing chain saw bars and more particularly to an attachment for effecting grinding and filing of chain saw bars and for carrying out the method.

In operation a chain saw picks up various abrasives, particularly from dead wood, which cause wear not only of the chain itself but also of the bar upon which the chain is mounted. In chain saws which have been used for some time the chains can cause uneven wear of the edges of the bars thereof because of the nature of the use thereof and particularly where improper sharpening of the teeth of the chain may occur. Where the chain is improperly sharpened there tends to be more wear on one side of the edge of the chain saw bar then on the other and it is necessary for continued effective use of the chain saw that this uneven wear be corrected. Moreover, in the normal use of the chain saw the abrasive material encountered tends over a period of time to wear a small groove in the face of the chain saw bar thereby developing an overlaping lip at the edge thereof. In order, again, to provide the most effective operation of the chain saw it is necessary from time to time to grind the face of the chain saw bar to provide a smooth surface against which the side of the chain may ride. By the present invention an attachment is provided whereby both the edge and the face of the chain saw bar may be ground in a convenient and expeditious manner to restore the chain saw bar to effective operating condition and thereby to prolong the life thereof and further whereby the edge of the chain saw bar may be conveniently filed.

SUMMARY OF THE INVENTION

In carrying out the invention, in one form thereof, an attachment is provided which includes a support member of L-shaped cross section having a first aperture in one leg through which a grinding wheel may extend and a second aperture in the other leg for receiving the shaft of the grinding wheel. An adjustably mounted plate having a third aperture therein is secured to the second leg and arranged to be brought into spaced relation to the first leg so that the first leg and the plate may ride along the opposite faces of the chain saw bar for effectively guiding the attachment and a grinding wheel mounted thereon along the edge of the bar. To effect grinding of the face of the chain saw bar the same attachment is employed but is positioned so that the plate rides along the edge of the chain saw bar to provide an effective guide. In addition, the first and third apertures are shaped for receiving and firmly holding a file for filing the edge of the chain saw bar as the attachment is moved along the bar.

DESCRIPTION OF THE DRAWINGS

For a better understanding of the invention reference may be had to the accompanying drawings in which.

DESCRIPTION OF THE PREFERRED EMBODIMENTS

Figure 1:
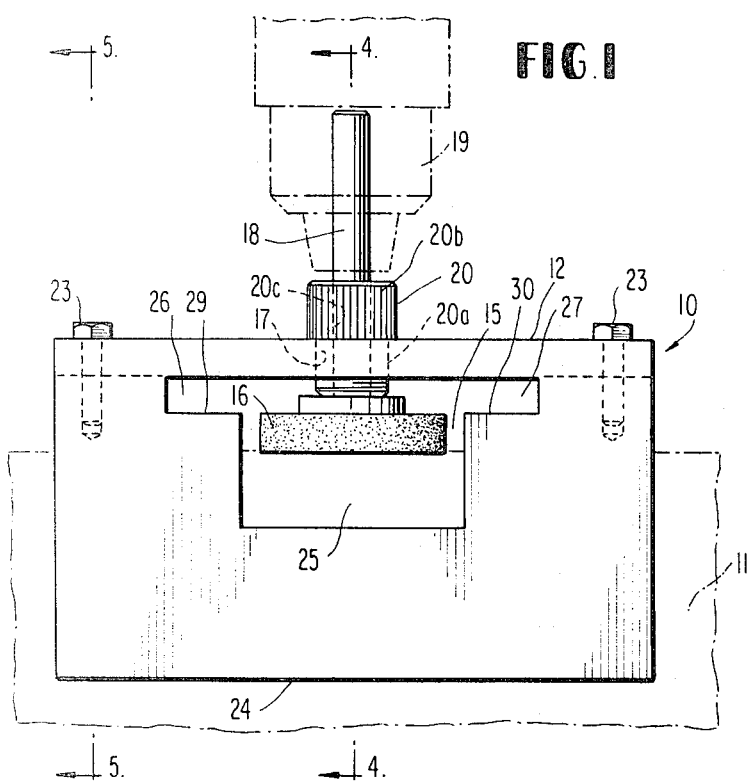
FIG. 1 is an elevation view of the attachment of this invention positioned for grinding the face of a chain saw bar.

Referring now to the drawings, and particularly to FIGS. 1-6 thereof, an attachment, generally indicated by the numeral 10, is shown mounted on a chain saw bar 11 in a position for grinding the edge of the bar. The attachment includes a support member 12 of L-shaped cross section, including a first leg 13 and a second leg 14. An aperture 15 is formed in the first leg through which a grinding wheel 16 may extend during the grinding operation. A threaded aperture 17 is provided in the second leg 14 of the support member for receiving the shaft 18 of the grinding wheel. The shaft in the assembled position, extends a sufficient distance above the leg 14 of the support member to be received in a chunk 19 of a standard portable electric drill (not shown) employed for driving the grinding wheel.

In order to facilitate assembly of the grinding wheel on the attachment the aperture 17 is made larger than the diameter of the shaft. For example, in one form of the invention, the aperture is made ½ inch in diameter while the shaft of the grinding wheel is normally approximately ¼ inch in diameter. In order to support the grinding wheel in the attachment an adapter 20 is provided for receiving the shaft 18 of the grinding wheel. The adapter includes a lower threaded portion 20a having a diameter corresponding to that of the aperture 17 for engagement with the threads of the aperture and an upper portion 20b of larger diameter extending above the leg 14 and adapted to engage the face of the leg 14 in the assembled position. The adapter has a passage 20c therethrough which has a diameter corresponding approximately to that of the shaft 18 of the grinding wheel for rotatably supporting the grinding wheel. In assembling the grinding wheel on the attachment the adapter is first removed to make the full size of the aperture 17 available. The shaft of the grinding wheel is then inserted at an angle through this aperture. The adapter is slid over the shaft and screwed into assembled engagement with the leg 14. The upper portion 20b of the adapter provides additional length for supporting the shaft so that the grinding wheel is maintained in proper relationship with the edge of the chain saw bar during the grinding operation.

Figure 2:
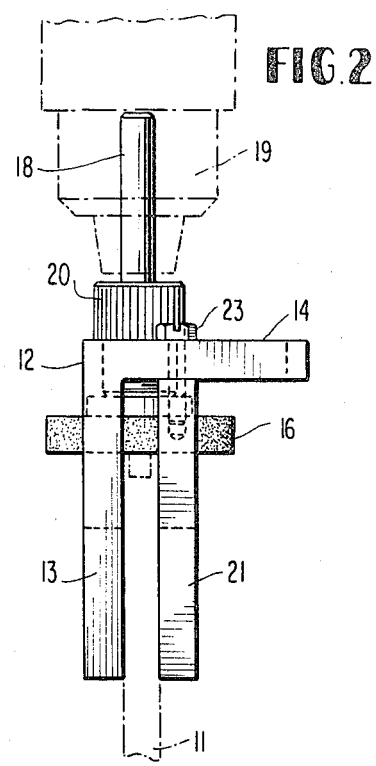
FIG. 2 is an end view of the structure shown in FIG. 1.
Figure 3:
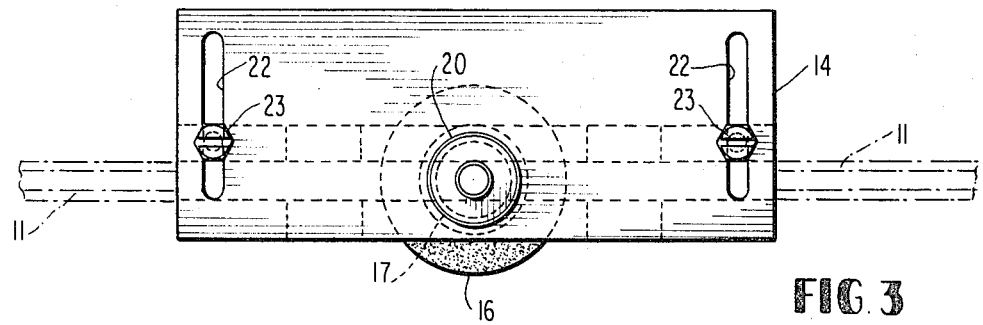
FIG. 3 is a top view of the structure shown in FIG. 1.
Figure 4:
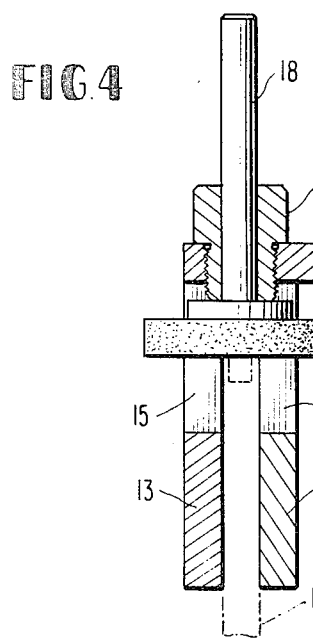
FIG. 4 is a sectional view taken along the line 4—4 in FIG. 1.
Figure 5:
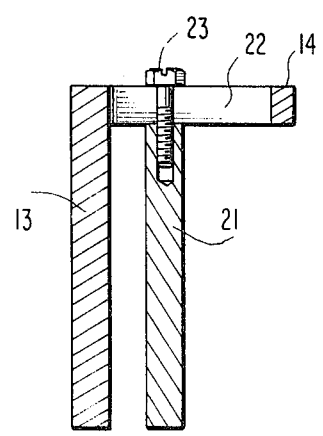
FIG. 5 is a sectional view taken along line 5—5 in FIG. 1.
Figure 6:
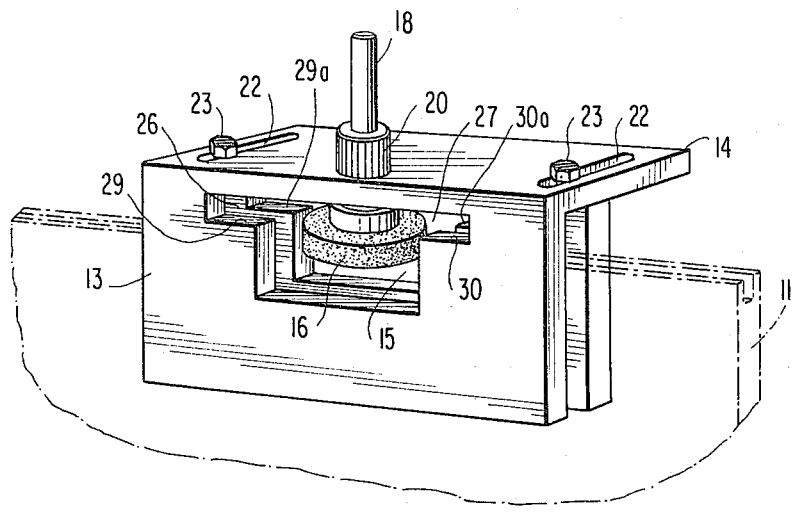
FIG. 6 is a perspective view similar to that shown in FIG. 1, illustrating the attachment in the position for grinding the edge of a chain saw bar.

The leg 13 of the support member, as best shown in FIG. 2, is arranged to slidingly engage one face of the chain saw bar. In order to provide for guiding the attachment along the length of the chain saw bar during the grinding operation an adjustable plate 21 is mounted on the second leg 14 of the support member so that it may be spaced from the leg 13 approximately the width of the chain saw bar. In this position, as again best seen in FIG. 2, the leg 13 and the plate 21 slidably engage opposite faces of the chain saw bar so as to guide the attachment and, of course, the grinding wheel, as the attachment is moved along the length of the chain saw bar for grinding the edge thereof. The plate 21 is formed to include the aperture 15a, corresponding in shape and size to that of aperture 15, through which the grinding wheel 16 may extend during the grinding operation.

In order to permit adjustment of the plate 21 so as to provide the proper spacing between leg 13 and plate 21 for sliding engagement with chain saw bars of different thickness, a pair of parallel elongated slots 22 are provided in the leg 14 extending transversely of this leg. Bolts 23 extend through these elongated openings 22 and are received in threaded openings in the plate 21. To adjust the plate to the proper position for effective grinding of a given chain saw bar the bolts 23 are loosened, the plate is moved to the proper spaced relationship with leg 13 and the bolts are then tightened. The most effective manner of accomplishing this is to loosen the bolts, 23, mount the attachment on the chain saw bar, as shown in FIG. 2, with the leg 13 in engagement with one face of the chain saw bar, move the plate 21 to lightly engage the opposite face of the chain saw bar with sufficient freedom to permit the attachment to be slid along the chain saw bar during the grinding operation, and then to tighten the bolts 23 to hold the plate in firm engagement with the leg 14 and properly spaced from the leg 13.

The most convenient manner of assembling the grinding wheel 16 is to loosen one of the bolts 23 and remove the other bolt 23 entirely. The plate 21 may then be swung outwardly away from the leg 13 to provide greater space for insertion of the grinding wheel. The shaft of the grinding wheel is then inserted through the aperture 17 in the second leg 14, the adapter is slid over the shaft and screwed into engagement with the aperture 17 to complete the assembly of the grinding wheel. The plate 21 is then swung back into a position parallel to leg 13 and properly spaced therefrom, the removed bolt 23 is replaced in engagement with plate 21, and both bolts 23 are then tightened. The shaft is then assembled in the chuck 19 of a standard portable electric drill. After the drill is turned on, the attachment is moved along the length of the chain saw bar to grind the edge of the bar. Normally, the attachment is held and moved with one hand while the electric drill is supported with the other hand, the chain saw bar being held in a vice or other suitable device.

If desired, the aperture 15 may be formed to extend through the lower edge 24 of the leg 13. This provides easier access for assembling the grinding wheel, but the form shown in the drawings is preferred because it slides more easily and evenly along the chain saw bar.

Figure 7:
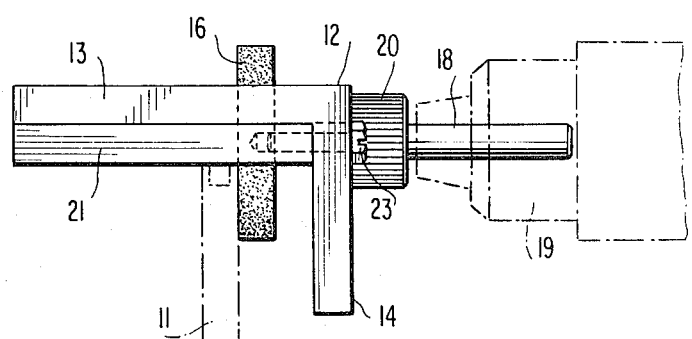
FIG. 7 is an elevation view of the attachment shown positioned for grinding a face of the chain saw bar.

The attachment of this invention is also suitable for grinding the faces of the chain saw bar. This utilization of the attachment is illustrated in FIG. 7. As shown, when this operation is to be performed, the adjustable plate 21 is moved into direct engagement with the leg 13. The attachment is then mounted on the chain saw bar with the plate 21 in engagement with the edge of the chain saw bar. The grinding wheel 16 is positioned adjacent one face of the chain saw bar. The attachment and the drill are then moved along the length of the chain saw bar to grind this face, the leg 14 moving parallel to the face of the chain saw bar. The attachment aids in supporting the weight of the drill. More importantly, by riding along the edge of the chain saw bar it aids in maintaining the grinding wheel 16 in a generally vertical orientation so that the chain saw bar is properly ground. When one face of the chain saw bar has been ground in this manner, the device is simply reversed to bring the grinding wheel into engagement with the other face of the chain saw bar and the operation is then repeated.

Figure 8:
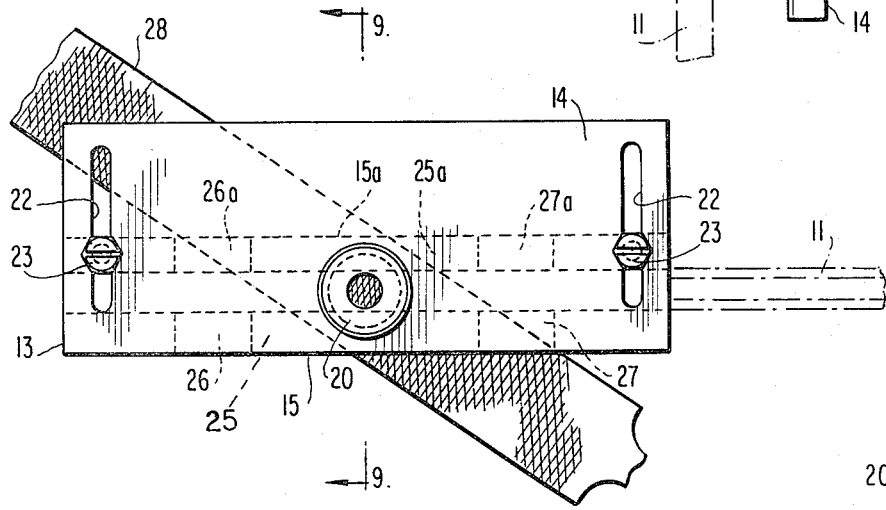
FIG. 8 is a top view of the attachment as employed for supporting a file for filing the edge of the chain saw bar.

If it is desired to simply file the edge of the chain saw bar or if it is desired to use a file in a finishing operation, the attachment of this invention provides a convenient arrangement for holding the file in the proper position. For this purpose the aperture 15 is formed to include a relatively wide central section 25 and more narrow end sections 26 and 27 extending from opposite ends of the central section 25 at the upper portion thereof. The aperture 15a in the plate 21 is similarly formed to include a central section 25a and end sections 26a and 27a. As best shown in FIG. 8 a file 28 may then be inserted in a diagonal position through the attachment 10 with one portion of the file being received in the end section 27 of the aperture 15 and another portion of the file being received in the end section 26a of the aperture 15a. In the position shown in FIG. 8, the file rests on the bottom walls 29a and 30 of sections 26a and 27, respectively, of the apertures. A file may also be placed in the opposite diagonal position, being then received within sections 26 and 27a and resting on the bottom walls 29 and 30a, respectively, of these sections. While it is preferred to make the apertures 15 and 15a in the form described above wherein end sections extend from both ends of the central section, it will be apparent that, if desired, the apertures could each be formed with only such end section. Thus, for example, referring to FIG. 8, the aperture 15 in leg 13 could be formed with only one end section 27 and the aperture 15a could be formed with only oppositely extending end section 26a. The file 28 could still be supported in the manner shown in FIGS. 8 and 9. Other aperture shapes not including end sections could also be employed so long as they include walls for supporting the file in the position shown.

Figure 9:
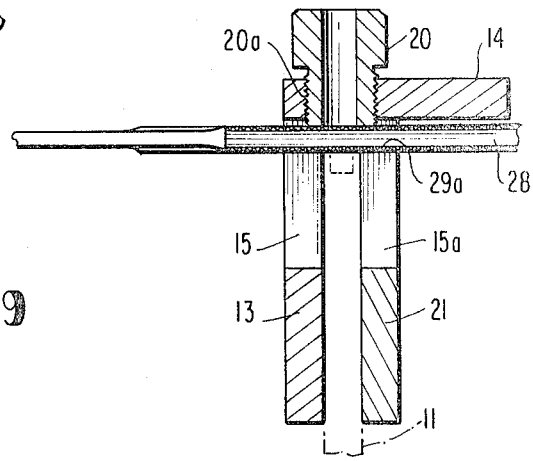
FIG. 9 is a sectional view along the line 9—9 in FIG. 8.

The adapter 20, which has been previously described in connection with its function of supporting the shaft 18 of the grinding wheel 16, is also effectively employed for holding the file 28 firmly in position for the filing operation. As shown in FIG. 9 the lower threaded portion 20a of the adapter 20 is of greater length than the thickness of the leg 14 of the support member and therefore may be screwed down to project below the lower edge of this leg 14. Again, as shown in FIG. 9 when the file has been assembled in its diagonal position in engagement with the walls 29a and 30, the adapter is screwed down until its lower edge engages the file and forces the file firmly into engagement with these walls. In this position the file 28 is held rigidly in place and, as the attachment 10 is moved along the length of the chain saw bar, the file is pressed against the edge of the chain saw bar to perform the filing operation.

It can be seen that by this invention a simple attachment has been provided which facilitates the grinding of the edge of the chain saw bar, the grinding of the faces of the chain saw bar and, if desired, the filing of the edge of the chain saw bar.

The manner of carrying out the several operations is summarized as follows. One of the bolts 23 is loosened and the other is removed. The plate 21 is then swung away from the leg 13 and the shaft 18 of the grinding wheel 16 is inserted through the aperture 17, the adpater is slid over the shaft and is threaded into engagement with the leg 14 to support the grinding wheel. The plate 21 is then swung back into a position parallel to leg 13 and the removed screw 23 is inserted through its elongated slot 22 and into threaded engagement with plate 21. To perform the face grinding operation the plate 21 is moved into abutting engagement with the leg 13, as shown in FIG. 7, and the screws 23 are tightened. The attachment is then positioned on the chain saw bar with the plate 21 resting on the edge of the chain saw bar and the grinding wheel 16 in engagement with one face thereof, as shown in FIG. 7. The attachment and the drill are then moved along this face of the chain saw bar to effect grinding of this face, the plate 21 riding along the edge of the chain saw bar. This grinding operation is continued until the face has been ground flush. Then the position of the attachment is reversed from that shown in FIG. 7 to grind the opposite face of the chain saw bar.

After both faces have been ground the screws 23 are loosened and the plate 21 is moved away from the leg 13 so that it is spaced therefrom by an amount slightly exceeding the thickness of the chain saw bar. The attachment is then mounted on the chain saw bar with the leg 13 in engagement with one face of the chain saw bar and the plate 21 is moved to lightly engage the opposite face of the chain saw bar with sufficient freedom to permit sliding engagement of the attachment with the chain saw bar. The screws 23 are then tightened to complete the assembly. The chuck of a suitable portable electric drill is clamped to the shaft 18 of the grinding wheel. The attachment is then in condition to be moved along the length of the chain saw bar for grinding the edge of the chain saw bar. The chain saw bar is normally mounted in a vise and one hand is used for moving the attachment along the chain saw bar and the other hand is employed for supporting the electric drill.

If it is desired to file the edge of the chain saw bar the plate 21 is positioned in spaced relationship as in the edge grinding operation. The adapter 20 is unscrewed to a sufficient extent to permit insertion of the file in the diagonal position shown in FIG. 8 beneath the bottom of the adapter. The adapter is then screwed down firmly against the file to hold the file in the diagonal position in engagement with the walls 29a and 30 of the apertures 26a and 27, respectively. The attachment is then moved along the length of the chain saw bar to effect the desired filing of the bar.

It is claimed:

1. A chain saw bar grinding attachment comprising:
   (a) a support member of L-shaped cross section including a first leg and a second leg;
   (b) said first leg being arranged to engage one face of the chain saw bar when said attachment is employed for grinding the edge of the chain saw bar;
   (c) said first leg including a first aperture through which a grinding wheel may extend;
   (d) said second leg including a second aperture for receiving the shaft of the grinding wheel;
   (e) an elongated plate connectable to said second leg and having a third aperture therein similar to said first aperture; and
   (f) means for adjustably holding said plate in engagement with said second leg and in spaced relationship with said first leg for sliding engagement with the other face of the chain saw bar;
   (g) said chain saw bar being receivable between said plate and said first leg when said attachment is employed for grinding the edge of the chain saw bar whereby said plate and said first leg provide guides slidably engaging opposite faces of chain saw bar.

2. The attachment as recited in claim 1 wherein:
   (a) said second aperture is threaded and is greater in size than the shaft of the grinding wheel to facilitate receiving the shaft therein; and further including:
   (b) an adapter threadedly received in said second aperture and having a passage therethrough corresponding in diameter to that of the shaft for receiving the shaft.

3. The attachment as recited in claim 1 wherein said means for adjustably holding said plate includes:
   (a) elongated openings in said second leg extending transversely of said second leg;
   (b) bolts extending through said elongated openings and engaging said plate for holding said plate in adjusted position in firm engagement with said second leg.

4. The attachment as recited in claim 1 wherein said plate is positioned to ride on the edge of the chain saw bar for guiding said attachment and said second leg is movable parallel to a face of the chain saw bar for effecting grinding of said face.

5. The attachment as recited in claim 1 wherein said first aperture extends to the edge of said first leg to facilitate insertion of the shaft of the grinding wheel through said second aperture.

6. The attachment as recited in claim 2 wherein:
   (a) each of said first and third apertures includes a wall adapted to support a file in engagement therewith; and
   (b) said adapter includes a portion extending below said second leg for engaging the file to hold the file in fixed position against said walls.

7. The attachment as recited in claim 2 wherein:
   (a) each of said first and third apertures includes a central section to accommodate the grinding wheel and further includes at least one end section extending beyond said central section;
   (b) said end sections being adapted to receive therein a file extending diagonally of said attachment; and
   (c) said adapter includes a portion extending below said second leg for engaging the file to hold the file in fixed position against walls of said end sections.

8. The attachment as recited in claim 2 wherein:
   (a) each of said first and third apertures includes a central section to accommodate the grinding wheel and further includes first and second end sections extending beyond said central section at opposite ends of said central section;
   (b) said end sections being adapted to receive therein a file extending diagonally of said attachment; and
   (c) said adapter includes a portion extending below said second leg for engaging the file to hold the file in fixed position against a wall of one of said first end sections and a wall of one of said second end sections.

9. The method of grinding the edge of a chain saw bar which comprises:
   (a) providing an attachment including an L-shaped member having first and second legs and a plate mounted on said second leg in spaced relationship to said first leg;
   (b) movably mounting said attachment on the chain saw bar with said first leg and said plate spaced to engage opposite sides of the chain saw bar to guide said attachment; and, (c) moving the attachment longitudinally of the chain saw bar to cause a grinding wheel mounted on said attachment to grind the edge of the chain saw bar.

10. The method of claim 9 and further including grinding the face of the chain saw bar comprising the additional steps of:
 (a) mounting said attachment on the chain saw bar with the plate in engagement with the edge of the chain saw bar to serve as a guide during movement of the attachment;
 (b) moving the attachment longitudinally of the chain saw bar while maintaining said second leg parallel to the face of the chain saw bar to cause the grinding wheel to grind the face of the chain saw bar.

11. The method of grinding the edge of a chain saw bar which comprises:
 (a) providing an attachment including spaced legs for receiving therebetween a chain saw bar;
 (b) movably mounting said attachment on the chain saw bar with said legs engaging opposite faces of the chain saw bar;
 (c) mounting a grinding wheel on the attachment; and
 (d) moving the attachment longitudinally of the chain saw bar to cause the grinding wheel to grind the edge of the chain saw bar.

* * * * *